United States Patent
Gries et al.

[15] 3,691,213
[45] Sept. 12, 1972

[54] 4-CHLORO-1α,2α,6α,7α-DIMETHYLENE-3-KETO-4-PREGNENE AND METHOD OF MAKING THE SAME

[72] Inventors: Heinz Gries; Josef Hader; Hermann Steinbeck, all of Berlin, Germany

[73] Assignee: Schering Aktiengesellschaft, Berlin and Bergkamen, Germany

[22] Filed: Feb. 12, 1970

[21] Appl. No.: 11,013

[30] Foreign Application Priority Data

Feb. 13, 1969 Germany..........P 19 07 804.7

[52] U.S. Cl. ..............260/397.4, 424/243, 260/239.5
[51] Int. Cl..............................................C07c 169/20
[58] Field of Search...................................260/397.4

[56] References Cited

UNITED STATES PATENTS 3,480,711  11/1969  Wiechert et al. .......260/397.4

Primary Examiner—Elbert L. Roberts
Attorney—Michael S. Striker

[57] ABSTRACT

4-chloro-1α,2α,6α,7α-dimethylene-3-keto-4-pregnene of the formula I

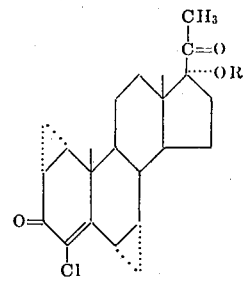

(I)

wherein R is hydrogen or an acid residue.
The compounds of the invention have a strong progestational and ovulation-inhibiting action.
The invention also embraces a method of making the compounds and pharmaceutical compositions in which the compounds defined above are the active ingredients.

6 Claims, No Drawings

4-CHLORO-1α,2α,6α,7α-DIMETHYLENE-3-KETO-4-PREGNENE AND METHOD OF MAKING THE SAME

CROSS-REFERENCES TO RELATED APPLICATIONS

The 6β,7β-methylene isomers of the presently claimed compounds have been disclosed and claimed in U.S. Pat. application Ser. No. 657,749, Wiechert et al. now U.S. Pat. No. 3,480,711, which is referred to and incorporated herein by reference, and which is assigned to the same assignee.

BACKGROUND OF THE INVENTION

The 4-chloro-1α,2α;6β,7β-dimethylene-3-keto-4-pregnene compounds which have been disclosed and claimed in the just-noted earlier application had been found to have a strong progestational and ovulation-inhibiting action. It has now been found that the 6α,7α-dimethylene compounds are superior to the previously disclosed 6α,7α-dimethylene compounds in their ovulation-inhibiting action.

SUMMARY OF THE INVENTION

The present invention therefore is directed to 4-chloro-1α,2α;6α,7α-dimethylene-3-keto-4-pregnene of the formula I

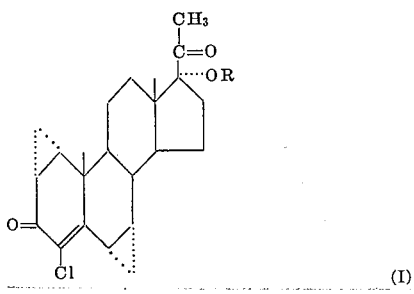 (I)

wherein R is hydrogen or an acid residue.

DESCRIPTION OF THE PREFERRED EMBODIMENTS

The acid residue R in the above formula I may be derived from any acid normally used in steroid chemistry for esterification reactions. The preferred acids are organic carboxylic acids having up to 15 carbon atoms, particularly the lower and intermediate aliphatic carboxylic acids. The acids may also be unsaturated, branched or polycarboxylic acids or they may be substituted in conventional manner, for instance by hydroxyl or amino groups or halogen atoms. Suitable also are cycloaliphatic, aromatic, mixed aromatic-aliphatic and heterocyclic acids, which likewise may be substituted in the conventional manner.

The preferred acids are, for instance: acetic acid, propionic acid, caproic acid, enanthic acid, undecylic acid, oleic acid, trimethylacetic acid, monochloroacetic acid, dichloroacetic acid, cyclopentylpropionic acid, phenylpropionic acid, phenylacetic acid, phenoxyacetic acid, dialkylaminoacetic acid, piperidinoacetic acid, succinic acid, benzoic acid, etc.

If water-soluble compositions are desired, the preferred esters would be those of inorganic acids such as the acids of sulfuric and phosphoric acid.

The superior ovulation-inhibiting action of the compounds of the invention was determined by the established tubal inspection. The following table shows the percentage portion of female rats in which ovulation did not occur after subcutaneous application of the indicated daily dosis:

TABLE

| Compound | Daily dose (in mg) | Ovulation-inhibiting action (in %) |
|---|---|---|
| (1) 4-chloro-17α-acetoxy-1,2α;6,7β-bismethylene-4-pregnene-3,20-dione | 0.1<br>0.03<br>0.01 | 40<br>0<br>0 |
| (2) 4-chloro-17α-acetoxy-1,2α;6,7α-bismethylene-4-pregnene-3,20-dione | 0.1<br>0.03<br>0.01 | 100<br>100<br>10 |

The Table shows that the 1,2α;6,7α-bismethylene steroid (2) has an ovulation-inhibiting action at a substantially lower dosage compared with the previously disclosed isomeric 1,2α;6,7β-bismethylene steroid (1).

In view of their valuable pharmaceutical properties, the compounds of the invention may, for instance, be used as anti-conception drugs and for other purposes in gynecology.

The compounds of the invention can be made in various manners. For instance, they may be made as disclosed in the above-listed earlier application by methylenating 4-chloro-3-keto-1,4,6-pregnatriene. The product of the methylenating step then consists of an isomer mixture of the 6β,7β-compound and the 6α,7α-methylene compound. The 6α,7α-isomer can be isolated from the mixture by conventional separation methods. The separation can for instance be carried out by chromatographic methods or by a fractional recrystallization or a combination of both methods.

Accordingly, the compounds of the invention may be made by subjecting a 4-chloro-3-keto-1,4,6-pregnatriene of the general formula II

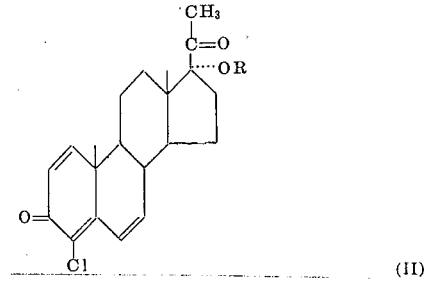 (II)

wherein R is hydrogen or acyl to methylenation as disclosed in the earlier application, and separating the 6α,7α-methylene compound from the resulting isomer mixture. The product depending on which type of R group is wanted in the final product may be subjected, prior to or after separation of the isomers, to esterification or saponification.

The esterification and saponification may be carried out in conventional manner. Preferred for the esterification is the reaction with acid anhydrides or acid chlorides in the presence of a free acid or the reaction of the desired acid in the presence of trifluoroacetic acid anhydride.

The saponification may be carried out with a base in an alcoholic solution.

The methylenation may be carried out in various manners; for instance suitable agents for this purpose are dimethylmethylenesulfonium oxide and diazomethane.

The dimethylemethylenesulfonium oxide can be obtained by reacting a trimethylsulfonium salt such as a halide, perchlorate or methyl sulfate with an anhydrous base in an aprotic solvent, such as dimethyl sulfoxide or dimethylformamide. The thus-obtained dimethylmethylene sulfonium oxide is then reacted, without isolating it, with the 4-chloro-1,4,6-triene-3-ketone at a temperature between −40° and 100° C, preferably at room temperature. There is thus obtained an isomer mixture of the 6β,7β-methylene- and the 6,7-methylene compound which two compounds are present, depending on the reaction conditions, at a ratio between 70:30 and 80:20.

Another method of methylenating the starting product comprises reacting the unsaturated keto compound with diazomethane and then splitting off nitrogen from the thus-obtained 1,2;6,7-bis-(diazomethylene) compound by thermal methods or catalytically. The thermal elimination of nitrogen is preferably effected in a high vacuum at a temperature of about 200°–250° C. The catalytic pyrazoline splitting is effected with acid catalysts such as fluoroboric acid, boron trifluoride etherate or perchloric acid in an organic solvent such as acetone, preferably at room temperature. The pyrazoline splitting can also be effected with a high boiling base such as quinoline or aniline at boiling temperatures.

Pharmaceutical composition in which the compounds of the invention are the effective agent can be prepared and administered in the same manner as disclosed in the noted earlier application.

The following examples will further illustrate the invention.

EXAMPLE 1

250 g of trimethylsuloxonium iodide were dissolved in 2.5 l dimethylsulfoxide while being stirred and employing a nitrogen atmosphere. After addition of 40 g of sodium hydroxide in a powdered form, stirring was continued in a nitrogen atmosphere for another 30 minutes. 180 g of 4-chloro-17-hydroxy-1,4,6-pregnatriene-3,20-dione were then added and stirring was effected for 75 minutes at room temperature. The mixture was then stirred into 35 l of ice water to which had been added 250 ml of acetic acid. The precipitate thus formed was removed by suction, washed with water and dried. There was obtained 185 g of a crude product which had a melting point between 222° and 228° C; UV: $\epsilon_{276} = 11.700$.

After recrystallization from methanol/methylene chloride (2:1) there was obtained 90.9 g 4-chloro-17-hydroxy-1α,2α;6,7-dimethylene-4-pregnene-3,20-dione; M.P. 260°–265° C; UV: $\epsilon_{276} = 12.960$.

74 g of this compound was suspended in 740 ml of acetic acid (glacial). 139 ml of acetic acid anhydride and 6.55 g of p-toluenesulfonic acid were then added and the mixture was stirred in a nitrogen atmosphere for 17 hours at room temperature. The mixture was then subjected to precipitation in 15 l ice water. The precipitate was removed by suction, washed neutral with water and dried. The thus-obtained crude 17-acetate was suspended in 400 ml of acetic acid ester, was heated for 30 minutes upon reflux, and cooled. The precipitate was removed by suction, washed with acetic acid ester and dried. There was thus obtained 73.2 g of 4-chloro-17-acetoxy-1α,2α;6,7-dimethylene-4-pregnene-3,20-dione; M.P. 269°–272° C; UV: $\epsilon_{275} = 12.950$; $[\alpha]_D = -19.4°$ (chloroform).

By repeated fractional recrystallization from methylene chloride/diisopropyl ether, there was obtained 4-chloro-17-acetoxy-1,2;6β,7β-dimethylene-4-pregnene-3,20-dione; m.p. 279°–280°C; UV: $\epsilon_{276} = 15.250$, $[\alpha]_D = -77°$ (chloroform).

The mother liquors were subjected to further concentration, and there was thus obtained by further fractionated crystallization from acetic acid ester 4-chloro-17-acetoxy-1α,2α;6α,7α-dimethylene-4-pregnene-3,20-dione; m.p. 264°–266°C; UV: $\epsilon_{268} = 10.400$; $[\alpha]_D = 233°$ (chloroform).

EXAMPLE 2

2 g of 4-chloro-17-acetoxy-1α,2α;6α,7α-dimethylene-4-pregnene-3,20-dione were suspended in 40 ml methanol and 1 ml tetrahydrofuran. A solution of 1.6 g sodium hydroxide in 5 ml water was then added to the suspension and stirring was effected in a nitrogen atmosphere for 17 hours at room temperature. The mixture was then poured into 800 ml ice water which contained 5 ml acetic acid. The formed precipitate was removed by means of a suction filter, washed neutral with water and dried in a vacuum at 50° C. There were thus obtained 1.6 g of 4-chloro-17-hydroxy-1α,2α;6α,7α-dimethylene-4-pregnene-3,20-dione. By recrystallization from acetic acid ester the pure compound was obtained, it having a melting point of 269°–271° C; UV: $\epsilon_{269} = 10.300$; $[\alpha]_D = 269.5°$ (chloroform).

EXAMPLE 3

2.5 ml of caproic acid anhydride and 100 mg of p-toluenesulfonic acid were stirred while excluding all moisture. To this mixture there were then added 1 g of 4-chloro-17-hydroxy-1α,2α;6α,7α-dimethylene-4-pregnene-3,20-dione and 2.5 ml caproic acid in a nitrogen atmosphere and while stirring. Precipitating was effected after 4 hours reaction time room temperature in ice water which contained 5 g sodium bicarbonate. The thus-formed precipitate was removed by suction, washed neutral with water and dried in a vacuum at 40° C. The crude capronate was then treated with diisopropylether in order to remove the residual caproic acid.

There was thus obtained 1 g of 4-chloro-17-hexanoyloxy-1α,2α;6α,7α-dimethylene-4-pregnene-3,20-dione. After crystallization from methanol, the compound had a melting point at 194°–195° C; UV: $\epsilon_{268} = 10.6,000$; $[\alpha]_D = 206.2°$ (chloroform).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. 4-chloro-1α,2α;6α,7α-dimethylene-3-keto-4-pregnene of the formula I

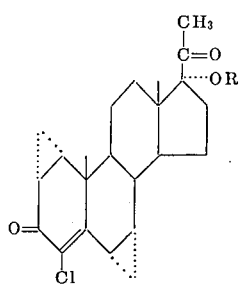

(I)

wherein R is hydrogen or an acid residue.

2. The compound of claim 1, wherein the acid residue is a residue of a carboxylic acid having up to 15 carbon atoms.

3. The compound of claim 1, which is 4-chloro-17-acetoxy-1α,2α;6α,7α-dimethylene-4-pregnene-3,20-dione.

4. The compound of claim 1, which is 4-chloro-17-hydroxy-1α,2α;6α,7α-dimethylene-4-pregnene-3,20-dione.

5. The compound of claim 1, which is 4-chloro-17-hexanoyloxy-1α,2α;6α,7α-dimethylene-4-pregnene-3,20-dione.

6. A pharmaceutical composition comprising the compound of claim 1 together with a pharmaceutically acceptable diluent.

* * * * *